Aug. 2, 1955   F. HUNZIKER   2,714,356
AERIAL CABLEWAY WITH VEHICLES WITH RUNNING GEAR
Filed April 29, 1950   2 Sheets-Sheet 1
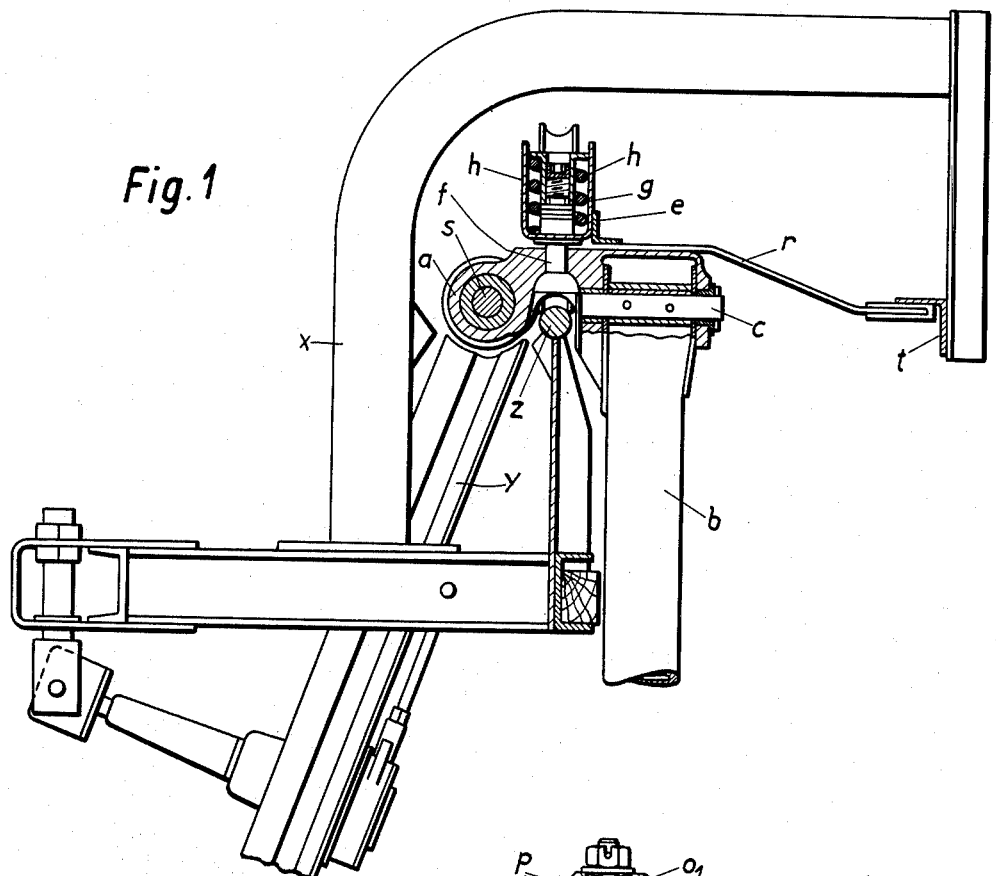
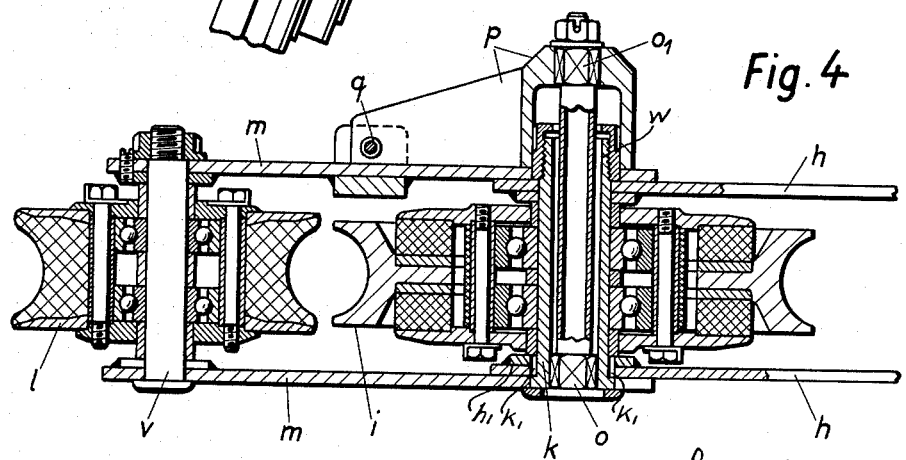
Inventor
Franz Hunziker
by Singer, Stern & Carlberg
Attorneys Aug. 2, 1955  F. HUNZIKER  2,714,356
AERIAL CABLEWAY WITH VEHICLES WITH RUNNING GEAR
Filed April 29, 1950  2 Sheets-Sheet 2

Inventor
Franz Hunziker
by Singer, Stern & Carlberg
Attorneys

United States Patent Office 2,714,356
Patented Aug. 2, 1955

2,714,356

AERIAL CABLEWAY WITH VEHICLES WITH RUNNING GEAR

Franz Hunziker, Kussnacht am Rigi, Switzerland

Application April 29, 1950, Serial No. 158,980

6 Claims. (Cl. 104—197)

In aerial cableways of the single-rope type the rope, or cable, is guided on pulleys at least some of which at the same time serve as supports for the rope, while other pulleys may serve only for guiding the rope around a horizontal bend or through a downward bend. One or more carriages are attached to the rope and when the means securing said carriages to the rope pass over the pulleys, it is necessary to have guide means which lift the rope with said means out of contact with the pulleys.

Usually this is accomplished by arranging in connection with each pulley a fixed support having a curved guide rail with which a number of wheels on the carriage carrier are brought into engagement when the carriage passes said fixed support, the curvature of said guide rail being such as to force the rope and the means securing the carriage thereto out of contact with the pulley. It is customary to provide said wheels in a frame which is connected with the carriage carrier in such a way as to enable said frame to perform a limited tilting movement in a plane perpendicular to the axes of the wheels.

With a structure of this type, the first wheel in the frame is normally brought into engagement with the guide rail smoothly and without appreciable knocking action. However, the second wheel to come into engagement with the guide rail frequently hits the guide rail with a violent knock which is detrimental to the operation of the cableway and shortens the life of the structural parts thereof.

Accordingly, it is a purpose of this invention to provide a structure of the type indicated in which said violent knocking action at the engagement of the second wheel with the guide rail is eliminated.

Another object of the invention is to provide, in an aerial cableway of the type indicated, a wheel carrier having four wheels, the first and last of which are first smoothly brought into engagement with the guide rail, whereupon yielding means connecting said first and last wheels to the wheel carrier frame are brought into action in order to allow the two middle wheels to engage the guide rail and assist in supporting the load.

Other objects of the invention will be evident from the following description of an embodiment thereof, reference being had to the accompanying drawings, in which:

Fig. 1 is a vertical cross-sectional view adjacent a fixed support;

Fig. 4 is a substantially horizontal cross-section through one end of the wheel carrier.

Figure 3:
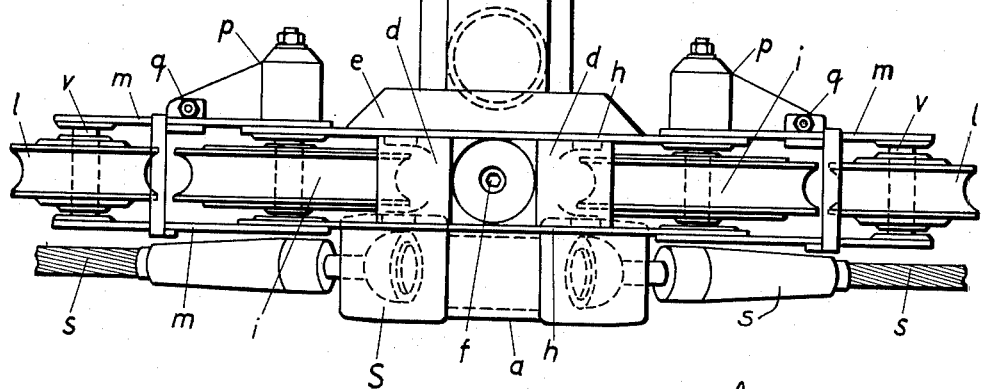
Fig. 3 is a plan view of the same at a fixed support.

As shown in Fig. 3 a rope $s$ is attached to a carriage carrier $a$ by means of rope couplings S. The carriage carrier $a$ is provided with lugs in which a pin $c$ is pivotally mounted, a carriage (not shown) being attached to said pin $c$ by means of a suspension member $b$.

A wheel carrier comprising a middle U-shaped frame $h$ is attached to the carriage holder $a$ by means of a vertical bolt $f$ extending through the bottom of said frame $h$ and also through the bottom of a second U-shaped member $u$ disposed between the legs of said frame $h$. Said bolt $f$ is threaded into a sleeve $f'$ provided with a top flange, and a coil spring $g$ is supported between said flange and the bottom of the U-shaped member $u$. The head of the bolt $f$ and the engaging surface of the carriage carrier $a$ are shaped so as to facilitate tilting movement of the bolt in the carriage carrier, as indicated particularly in Fig. 2.

The frame $h$ is substantially parallel with the rope $s$ and located at the side of said rope. A wheel $i$ is rotatably mounted at each end of the frame $h$ on a substantially horizontal shaft $k$ which is hollow and secured to the member $h$ by means of a screw cap $w$. Said shaft $k$ is prevented from turning in the frame $h$ by means of keys $k_1$ secured to the shaft $k$ and engaging grooves in the member $h$ and a reinforcing ring $h_1$ welded thereto. The shaft $k$ also supports an extension member $m$ which is provided at its free end with a shaft $v$ on which a wheel $l$ is rotatably mounted.

A cap and lever member $p$ is pivotally secured on the cap $w$ by means of a torsion rod the end portions $o$ and $o_1$ of which are non-rotatably secured to the shaft $k$ and the cap and lever member $p$, respectively. The free end of the member $p$ is located between two set screws $q$ arranged in suitable flanges at the top and bottom edges of the extension member $m$. An arm $r$ is secured to the carriage holder and extends sideways from the same as indicated in Fig. 1 for a purpose to be explained below.

A flange $e$ secured to the carriage carrier $a$ maintains the frame $h$ substantially parallel with the rope, while longitudinal tilting movements of the frame $h$ on the carriage carrier $a$ are limited by means of a pair of wings $d$ disposed between the legs of the frame $h$, one at each side of the U-shaped member $u$.

Figure 2:
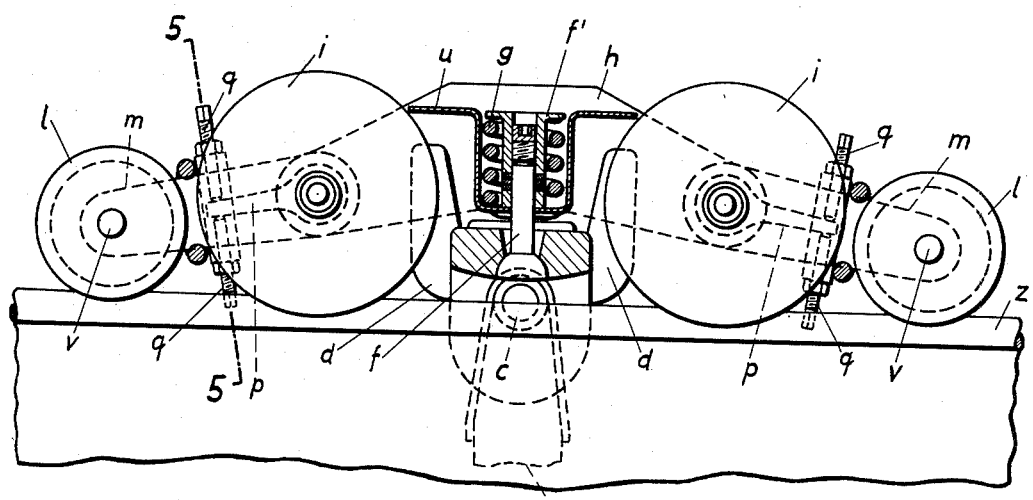
Fig. 2 is an elevation of the guide rail and wheel carrier, partly in longitudinal section.
Figure 5:
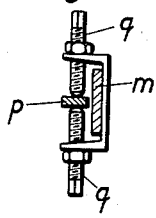
Fig. 5 is an elevation, partly in cross-section, of a detail of the wheel carrier.

Each fixed support $x$ carrying a rope guiding pulley $y$ is provided with a guide rail $z$ which, when the pulley engages the rope on the bottom side of said rope, is curved upwards from both ends (not shown in the drawing). Said guide rail $z$ extends to both sides of the support $x$ and, in the present embodiment, has a straight top portion, as indicated in Fig. 2. In cases where the pulley $y$ is located above the rope $s$ the guide rail $z$ would be curved downwards from the ends. This embodiment is not shown in the drawing.

The support $x$ is also provided with a longitudinal guide $t$ for engagement with the previously mentioned arm $r$ as shown in Fig. 1. If desired, said arm $r$ or guide $t$ may be provided with pulleys for engagement with the other member.

In operation, when the carriage carrier $a$ approaches a support $x$, the front wheel $l$ in the wheel carrier will first be brought into engagement with the guide rail $z$. By suitable setting of the set screws $q$ the elevational relation between the middle wheels $i$ and the end wheels $l$ is such as to cause the rear wheel $l$ to next engage the guide rail $z$ after the wheel carrier has been tilted by the previous engagement of the front wheel $l$ with said guide rail $z$.

The load on the member $b$ will next cause the middle wheels $i$ to engage the guide rail $z$ under torsional stress of the torsion bolts in the hollow shaft $k$. With this arrangement, the engagement between the rear end wheel $l$ and the guide rail $z$ occurs smoothly and without objectional knocking action. This operational feature may be further improved by the provision of a yielding cover, such as rubber, on the wheels $l$. The elevation of the carriage carrier on the guide rail $z$ brings the arm $r$ into engagement with the guide $t$ which serves to dampen or prevent swinging movements of the member b and the carriage.

Obviously, since the elevating action of the guide rail z is applied to the wheel carrier and not directly to the carriage carrier a, said action results in compression of the spring g. The distance between the flanges carrying the set screws q is preferably great enough to permit the initial setting of the end wheels l in relation to the middle wheels i to accommodate the wheel carrier for curvature of the guide rail z either upwardly or downwardly.

It is thus seen that the invention provides an aerial cableway structure in which the detrimental knocking action of the second wheel hitting the guide rail is eliminated. The appended claims are intended to cover all legitimate modifications and variations of the invention.

What I claim is:

1. In an aerial cableway of the type comprising a single rope secured to a carriage carrier and guided on a pulley rotatably mounted in a stationary support, with wheels in a longitudinally tiltable frame on said carriage carrier adapted to run on a guide rail in said support to maintain the rope out of engagement with said pulley during passage of the carriage carrier past said support, the improvement comprising an extension member at each end of said frame, means pivotally connecting said extension member to said frame on an axis parallel with the axes of said wheels, a shaft in said extension member parallel with the axes of said first mentioned wheels, a wheel rotatably mounted on said shaft for engagement with said guide rail, and yieldable means connected with said frame and with said extension member, whereby said extension member is yieldingly maintained in a predetermined angular position in relation to said frame.

2. An aerial cableway as set forth in claim 1, in which said frame is yieldingly supported on said carriage carrier so as to allow limited movement of said frame toward and from the carriage carrier.

3. An aerial cableway as set forth in claim 1, in which said yieldable means is adjustable, whereby said predetermined angular position of the extension member in relation to the frame is adjustable.

4. In a single-rope aerial cableway, a carriage carrier, means securing said carriage carrier to said rope, a stationary support, a pulley rotatably mounted in said support for guiding said rope, a frame, means yieldingly and tiltably connecting said frame to said carriage carrier, transverse shafts in said frame, spaced longitudinally thereof, wheels rotatably mounted on said shafts, a guide rail in said support for cooperation with said wheels said guide rail being adapted to maintain the rope out of contact with the pulley during passage of the carriage carrier, an extension member at each end of said frame, means pivotally connecting said extension member to said frame on an axis parallel with the axes of said wheels, another wheel for engagement with said guide rail, means rotatably connecting said other wheel with said extension member on an axis parallel with the axes of said first mentioned wheels, yieldable means connected with said frame and with said extension member so as to yieldably maintain said extension member in a predetermined angular position in relation to said frame, and means for adjusting said angular position.

5. In an aerial cableway, of the type comprising a single rope secured to a carriage carrier and guided on a pulley rotatably mounted in a stationary support, with wheels in a longitudinally tiltable frame on said carriage carrier adapted to run on a guide rail in said support to maintain the rope out of engagement with said pulley during passage of the carriage carrier past said support, the improvement comprising an extension member at each end of said frame, means pivotally connecting said extension member to said frame on an axis parallel with the axes of said wheels, a shaft in said extension member parallel with the axes of said first mentioned wheels, a wheel rotatably mounted on said shaft for engagement with said guide rail, a torsion rod extending through said means connecting the extension member to said frame, means non-rotatably securing one end of said torsion rod to said frame, a lever member non-rotatably secured at one end to the other end of said torsion rod, and means connecting the free end of said lever member to said extension member at a point remote from said torsion rod.

6. An aerial cableway as set forth in claim 5 in which said means connecting the free end of said lever member to said extension member is adjustable, whereby the angular position of said extension member in relation to said frame is adjustable.

References Cited in the file of this patent

UNITED STATES PATENTS

| | | |
|---|---|---|
| 2,140,585 | Johansen et al. | Dec. 20, 1938 |
| 2,198,536 | Johansen et al. | Apr. 23, 1940 |
| 2,228,391 | Hunziker | Jan. 14, 1941 |
| 2,238,265 | Hunziker | Apr. 15, 1941 |